E. ROLIN.
DRAW BAR.
APPLICATION FILED MAY 19, 1908.
904,727.
Patented Nov. 24, 1908.
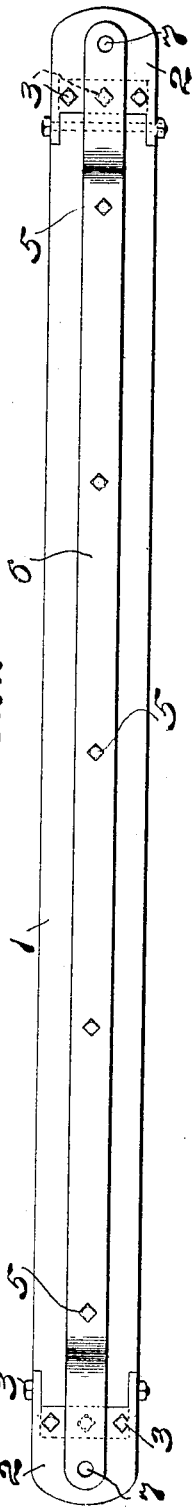
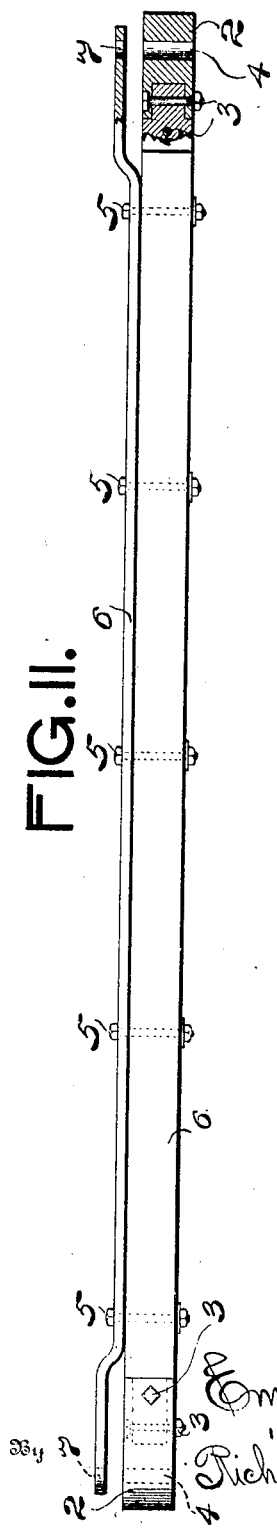

UNITED STATES PATENT OFFICE.

EMILE ROLIN, OF MORGAN, PENNSYLVANIA.

DRAW-BAR.

No. 904,727.

Specification of Letters Patent.

Patented Nov. 24, 1908.

Application filed May 19, 1908. Serial No. 433,630.

*To all whom it may concern:*

Be it known that I, EMILE ROLIN, citizen of the United States, residing at Morgan, in the county of Allegheny and State of Pennsylvania, have invented certain new and useful Improvements in Draw - Bars, of which the following is a specification.

My invention relates to certain new and useful improvements in draw-bars for pit cars and has for its object the provision of a simple, practical and serviceable device provided with a head at each end and adapted to be rigidly secured to the car or truck.

In the accompanying drawings I have illustrated my invention, in which drawings, Figure I, is a plan view thereof and Fig. II, a side elevation, partly in section, similar detail parts of the invention being designated by numerals of like character in the following description.

The invention consists of a wooden beam 1 adapted to be secured to and extend from one end of the car to the other, said beam having a shouldered portion formed upon each end to receive a metal bumper 2 having an opening therein to correspond with the said shoulder and is secured thereto by bolts 3, said bumper portion being provided with a pin opening 4. The beam has also secured thereto, by bolts 5, a longitudinally disposed metal bar 6 having its ends turned upwardly and forwardly so as to form a space between the same and the bumper portion for the reception of the coupling links, which ends are provided with openings 7 registering with the coupling pin openings in the bumpers.

If desired the bar 6 may be made in two parts and secured to the beam instead of running the full length, but the latter is preferable owing to its greater strength.

Having thus fully shown and described my invention, what I claim as new and desire to secure by Letters Patent is:

1. A draw-bar, comprising a horizontally disposed beam having a bumper head secured to each end thereof, and a bar secured to and extending longitudinally therewith the ends of which extend up and over the upper surface of the bumper heads to form a space to receive the coupling links, said bumper heads and bar ends each having vertically disposed and registerable openings therein to receive the coupling pin.

2. A draw-bar, comprising a horizontally disposed beam having a shoulder formed upon each end, a bumper head fitted over the shouldered portion of each end thereof, and a bar secured to and extending longitudinally therewith the ends of which extend up and over the upper surface of the bumper heads on the beam to form a space therebetween to receive the coupling links, said bumper heads and bar each having vertically disposed and registerable openings therein to receive the coupling pins.

In testimony whereof I affix my signature in presence of two witnesses.

EMILE ROLIN.

Witnesses:
W. F. RUSSELL,
JOHN CHABALA.